(12) United States Patent
Matoba

(10) Patent No.: US 7,948,646 B2
(45) Date of Patent: May 24, 2011

(54) INFORMATION PROCESSING APPARATUS EASY FOR USERS TO OPERATE

(75) Inventor: Kazuo Matoba, Akashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1436 days.

(21) Appl. No.: 11/190,825

(22) Filed: Jul. 28, 2005

(65) Prior Publication Data
US 2006/0235896 A1    Oct. 19, 2006

(30) Foreign Application Priority Data

Apr. 14, 2005    (JP) .................................. 2005-116989

(51) Int. Cl.
*H04N 1/00*    (2006.01)
*G06K 15/00*    (2006.01)
*G06F 3/12*    (2006.01)

(52) U.S. Cl. ........................ 358/1.15; 358/1.16; 358/405

(58) Field of Classification Search ................. 358/1.15, 358/1.1, 1.13, 1.16, 1.9, 2.1, 1.6, 400, 468, 358/407, 405, 406, 404; 347/264, 262
See application file for complete search history.

(56) References Cited

U.S. PATENT DOCUMENTS

| | | | |
|---|---|---|---|
| 5,907,410 | A | 5/1999 | Ohtake |
| 6,130,760 | A | 10/2000 | Nickerson |
| 6,271,926 | B1 | 8/2001 | Jacobs |
| 6,570,605 | B1 * | 5/2003 | Kashiwazaki ............... 347/264 |
| 6,778,288 | B1 | 8/2004 | Ogaki et al. |
| 7,130,068 | B1 * | 10/2006 | Ohta ........................... 358/1.15 |
| 7,450,259 | B2 * | 11/2008 | Gassho et al. ............... 358/1.15 |
| 7,466,432 | B2 * | 12/2008 | Mitani ............................. 358/1.1 |
| 2005/0165810 | A1 * | 7/2005 | Yokoyama ................... 707/100 |
| 2008/0140764 | A1 * | 6/2008 | Green ........................... 709/202 |

FOREIGN PATENT DOCUMENTS

| | | |
|---|---|---|
| JP | 6-113048 | 4/1994 |
| JP | 10-021192 A | 1/1998 |
| JP | 2001-69276 | 3/2001 |
| JP | 2002-007020 | 1/2002 |
| JP | 2002-123452 | 4/2002 |
| JP | 2002-200818 | 7/2002 |
| JP | 2002-351702 | 12/2002 |
| JP | 2004-094574 | 3/2004 |
| JP | 2004-259096 | 9/2004 |

OTHER PUBLICATIONS

Smith et al., "Detect Suspicious Access with Security Log, Examine Collected Logs to Find Intruder, Traceable from Log-On to File Operation" Nikkei Windows 2000, No. 41, Nikkei Business Publications Inc. Aug. 1, 2000, pp. 179-186.
Japanese Office Action, with English-language translation, dated Apr. 20, 2010.

* cited by examiner

*Primary Examiner* — Jerome Grant, II
(74) *Attorney, Agent, or Firm* — Buchanan Ingersoll & Rooney PC

(57) ABSTRACT

In an information processing apparatus, a job log recording unit generates a job log that is a history of operations and settings based on user's operation. An operation/setting sequence extraction unit extracts a sequence by extracting job logs constituting a series of operations and/or settings. Of extracted sequences, a sequence for which an operation/setting sequence frequency/resemblance detection unit detects that the sequence has a predetermined frequency or a predetermined degree of resemblance, namely a sequence of operation repeatedly performed, is presented to the user by an operation/setting sequence presentation/registration unit for registration of the sequence by user's operation. Subsequently, in the information processing apparatus, a registered sequence is selected for automatically performing a series of operations and/or settings.

14 Claims, 18 Drawing Sheets

FIG.5

| USER IDENTIFICATION INFORMATION : ABC |
|---|
| |
| LOG ID : 1011<br>OPERATION SETTING FUNCTION : RESOLUTION<br>OPERATION SETTING DETAILS : 200dpi<br>TIME : 14:35<br>PRECEDING LOG ID : 1010<br>SUCCEEDING LOG ID : 1012 |
| ⋮ |
| LOG ID : ...<br>OPERATION SETTING FUNCTION : ...<br>OPERATION SETTING DETAILS : ...<br>TIME : ...<br>PRECEDING LOG ID : ...<br>SUCCEEDING LOG ID : ... |
| |

FIG.8

| SEQUENCE ID | CONSTITUENT LOG ID | USER IDENTIFICATION INFORMATION | FREQUENCY OF USE | DEGREE OF RESEMBLANCE |
|---|---|---|---|---|
| 11 | 1009<br>1010<br>.<br>.<br>1019 | ABC | 382 | 28 |
| ... | ... | ... | ... | ... |
| 181 | ... | XYZ | 109 | 422 |
| ... | ... | ... | ... | ... |

FIG.11

| SEQUENCE ID | CONSTITUENT LOG ID | USER IDENTIFICATION INFORMATION | FREQUENCY OF USE | DEGREE OF RESEMBLANCE | REGISTRATION |
|---|---|---|---|---|---|
| 11 | 1009<br>1010<br>⋮<br>1019 | ABC | 382 | 28 | SCAN TRANSMISSION 1 |
| ... | ... | ... | ... | ... | ... |
| 181 | ... | XYZ | 109 | 422 | NONE |
| ... | ... | ... | ... | ... | ... |

FIG.15

| FILE OPERATION SEQUENCE ID | SEQUENCE ID | USER IDENTIFICATION INFORMATION | FILE NAME KEYWORD INFORMATION | FREQUENCY OF USE | DEGREE OF RESEMBLANCE |
|---|---|---|---|---|---|
| F18 | 212 | ABC | REPORT | 226 | 188 |
| | 82,1033 | DKK | | | |
| | 411 | XYZ | | | |
| ... | ... | ... | ... | ... | ... |
| F266 | 25,188, ... | DEF | PLAN | 38 | 249 |
| | 5,372, ... | FPP | | | |
| ... | ... | ... | ... | ... | ... |

INFORMATION PROCESSING APPARATUS EASY FOR USERS TO OPERATE

This application is based on Japanese Patent Application No. 2005-116989 filed with the Japan Patent Office on Apr. 14, 2005, the entire content of which is hereby incorporated by reference.

BACKGROUND OF THE INVENTION

1. Field of the Invention

The present invention relates to an information processing apparatus and an information processing program product and particularly to an information processing apparatus and an information processing program product that are easy for users to operate.

2. Description of the Related Art

In recent years, such information processing apparatuses as MFP (Multi Function Peripherals) have been increasingly improved in functionality to cause functional and setting options to increase, for example, resulting in complexity of operation. Moreover, a work flow requires complex operation including multiple operations of an information processing apparatus that are associated with each other. Accordingly, users have to repeat a sequence of a series of operations and settings including a combination of multiple operations and settings, which is inconvenient for users.

A technology with the purpose of improving users' convenience is disclosed for example in Japanese Laid-Open Patent Publication No. 2001-69276 showing a copier that sets, based on a job history, a mainly used mode as an initial mode. Such a technology is also disclosed in Japanese Laid-Open Patent Publication No. 6-113048 showing a method of controlling a facsimile machine setting, for each user, based on information about an operational history, the order of selection of items when the machine is being operated.

Such conventional devices as described above, however, merely refer to a job history to customize the order of displaying panels for example used for operations and settings, and thus do not customize a sequence of a series of operations and settings. Therefore, even if switching of the operational setting screen can be dispensed with, the sequence of a series of operations and settings has to be specified each time the user operates the device, leaving the problem of complexity and inconvenience in operation.

SUMMARY OF THE INVENTION

The present invention has been made in consideration of the aforementioned problem and an object of the invention is to provide an information processing apparatus and an information processing program product that are easy for users to operate, particularly when a sequence of a series of operations and settings is repeated.

In order to achieve the above object, according to an aspect of the present invention, an information processing apparatus is configured to include: a job log recording unit for generating and recording a job log including identification information of a user, information specifying an operation of the user on the information processing apparatus and information indicating linkage with an adjacent job log; a sequence extraction unit for extracting, from the job log recording unit, a job log constituting a sequence that is an operation of the user; and a sequence presentation unit for presenting the extracted sequence to the user.

According to another aspect of the present invention, an information processing program product for a computer to execute information processing by an information processing apparatus is provided and the information processing includes: a job log recording step for generating a job log including identification information of a user, information specifying an operation of the user on the information processing apparatus and information indicating linkage with adjacent job logs and recording the job log in a job log recorder; a sequence extraction step for extracting, from the job log recorder, a job log constituting a sequence that is an operation of the user; and a sequence presentation step for presenting the extracted sequence to the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a specific example of job logs.

FIG. 8 shows a specific example of information that specifies sequences and is stored in step S215 in an operation/setting sequence presentation/registration unit 108.

FIG. 11 shows a specific example of information that specifies sequences and is stored in step S413 in operation/setting sequence presentation/registration unit 108.

FIG. 15 shows a specific example of information that specifies sequences on a basis of what is to be processed.

DESCRIPTION OF THE PREFERRED EMBODIMENTS

Figure 1:
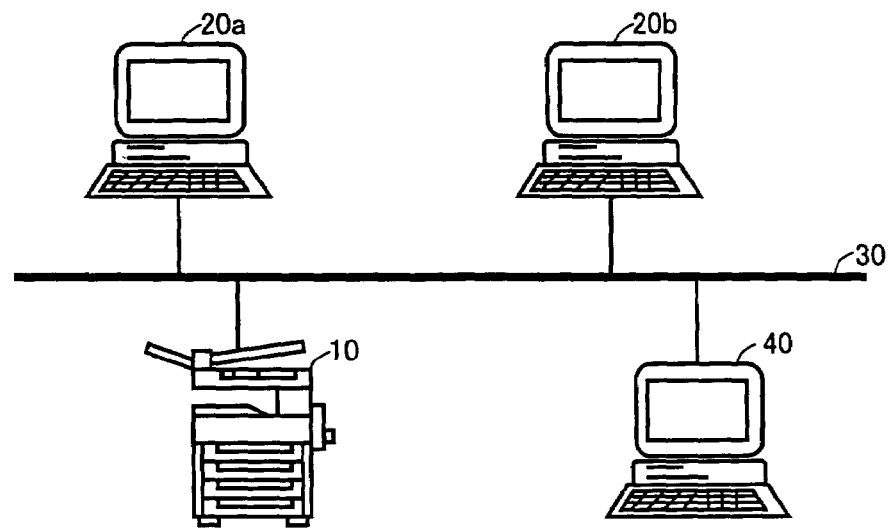
FIG. 1 shows a specific example of the configuration of a network printing system according to an embodiment of the present invention.

An embodiment of the present invention is hereinafter described with reference to the drawings. In the following description, like parts or components are denoted by like reference characters and have like names and like functions as well. Thus, a detailed description thereof will not be repeated here.

Referring to FIG. 1, a network printing system according to the present embodiment includes an MFP (Multi Function Peripheral) 10 that is an example of the information processing apparatus, such terminal devices 20a, 20a as PCs (personal computers) (they are referred to collectively as PC 20) giving instructions for a printing job to MFP 10, and a server 40 firstly receiving the printing job from PC 20 to instruct MFP 10 to execute the printing, and these components are connected to each other by such a network as LAN (Local Area Network) 30 so as to allow data and information to be transmitted to/from each other.

Figure 2:
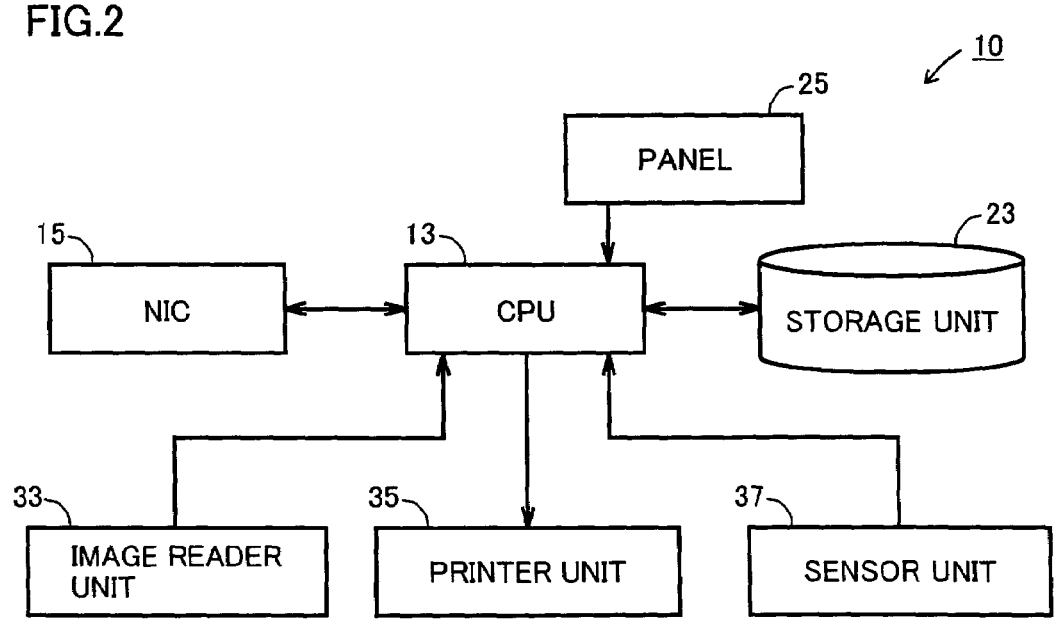
FIG. 2 is a block diagram showing a specific example of the hardware configuration of an MFP 10.

Referring to FIG. 2, MFP 10 includes a CPU (Central Processing Unit) 13 controlling the whole of the apparatus, an image reader unit 33 reading image data from an original document, a printer unit 35 printing an image on a sheet of paper, an NIC (Network Interface Card) 15 that is an expansion card inserted into an expansion slot (not shown) for connecting MFP 10 to network 30 and telephone lines or for short-haul radio communication, a storage unit 23 including, as its component, an HD (Hard Disc) for storing for example job data, job logs and programs executed by CPU 13, a panel 25 that is an interface with users, and a sensor unit 37 detecting for example the stock of consumables.

Figure 3:
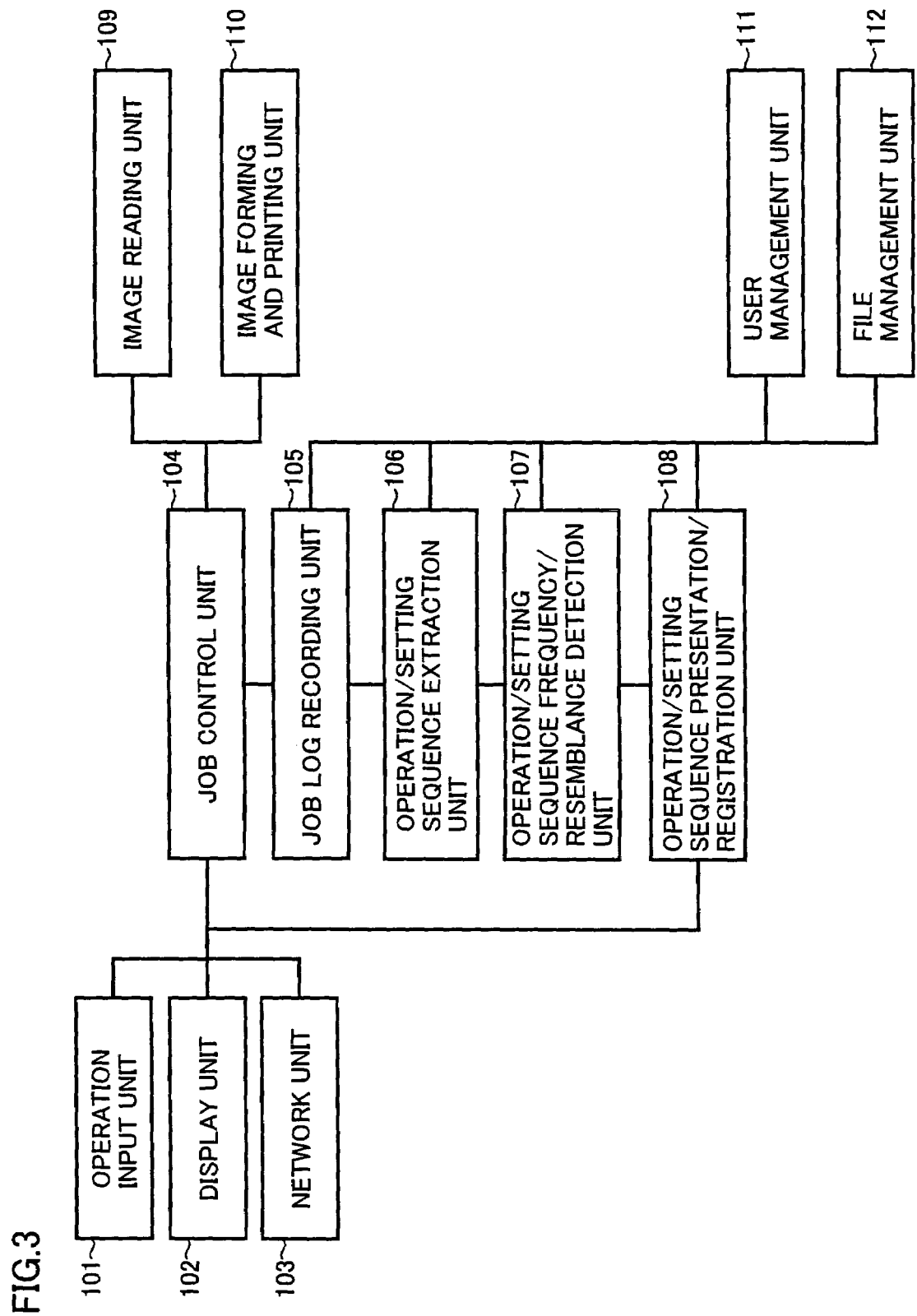
FIG. 3 is a block diagram showing the functional configuration of MFP 10.

Referring to FIG. 3, MFP 10 includes an operation input unit 101 for entering a user operation for example on panel 25, a display unit 102 for screen display for example on panel 25, a network unit 103 for communication for example by NIC 15 with PC 20 and server 40 via network 30, a job control unit 104 for controlling jobs in MFP 10, a job log recording unit 105 for generating and recording, in a predetermined region of storage unit 23, job logs showing a history of operations and settings, an operation/setting sequence extraction unit 106 for extracting from job log recording unit 105 a sequence that is a series of operations and/or settings, an operation/setting sequence frequency/resemblance detection unit 107 for detecting the frequency and/or the degree of resemblance of the extracted sequence, an operation/setting sequence presentation/registration unit 108 for presenting a sequence on panel 25 for example and registering the sequence in a predetermined region of storage unit 23, an image reading unit 109 for reading an image of an original document by image reader unit 33 for example, an image forming and printing unit 110 for forming an image to be printed and printing the image by printer unit 35, a user management unit 111 for managing log-in information of users, and a file management unit 112 for managing image files for which jobs are performed.

The functions shown in FIG. 3 are each carried out by reading and execution by CPU 13 of a program stored in storage unit 23.

Operation input unit 101 enters an operation signal to job control unit 104 based on any user operation on panel 25 for example. Network unit 103 also enters an operation signal to job control unit 104 based on any user operation on PC 20 or server 40.

Job control unit 104 outputs a control signal to image reading unit 109 based on the entered operation signal to request reading of an image of an original document. In response to the request from job control unit 104, image reading unit 109 reads the image of the original document that is a paper document.

Further, job control unit 104 outputs a control signal to image forming and printing unit 110 based on the entered operation signal to request forming and printing of the printing image. In response to the request from job control unit 104, image forming and printing unit 110 generates printing information from image information read by image reading unit 109 and makes a print as required.

Furthermore, job control unit 104 searches user information managed by user management unit 111 for a destination based on the entered operation signal and outputs a control signal to network unit 103 to request transmission to the destination. In response to the request from job control unit 104, network unit 103 outputs to a predetermined destination the image information read by image reading unit 109 or the image information formed by image forming and printing unit 110.

Moreover, job control unit 104 outputs a control signal to job log recording unit 105 based on the entered operation signal to request generation and recording of job logs showing a history of operations and settings.

In response to the control signal from job control unit 104, job log recording unit 105 generates and records job log based on the operation signal.

Operation/setting sequence extraction unit 106 accesses job log recording unit 105 to extract a sequence that is a series of operations and/or settings and enters information about the sequence (sequence information) to operation/setting sequence frequency/resemblance detection unit 107. Operation/setting sequence frequency/resemblance detection unit 107 detects the frequency and/or the degree of resemblance of the sequence based on the sequence information entered from operation/setting sequence extraction unit 106, adds the frequency and/or the degree of resemblance to the sequence information and then enters the resultant sequence information to operation/setting sequence presentation/registration unit 108 for registration.

Operation/setting sequence presentation/registration unit 108 requests display unit 102 or network 103 to present sequences on panel 25 or a display device of PC 20 for example, based on the sequence information entered from operation/setting sequence frequency/resemblance detection unit 107. Further, operation/setting sequence presentation/registration unit 108 registers a predetermined sequence based on the operation signal according to any user operation that is entered from operation input unit 101 or network unit 103.

Based on any user operation, MFP 10 in the present embodiment performs:
(1) job log generation process;
(2) sequence extraction process; and
(3) sequence registration process.

Figure 4:
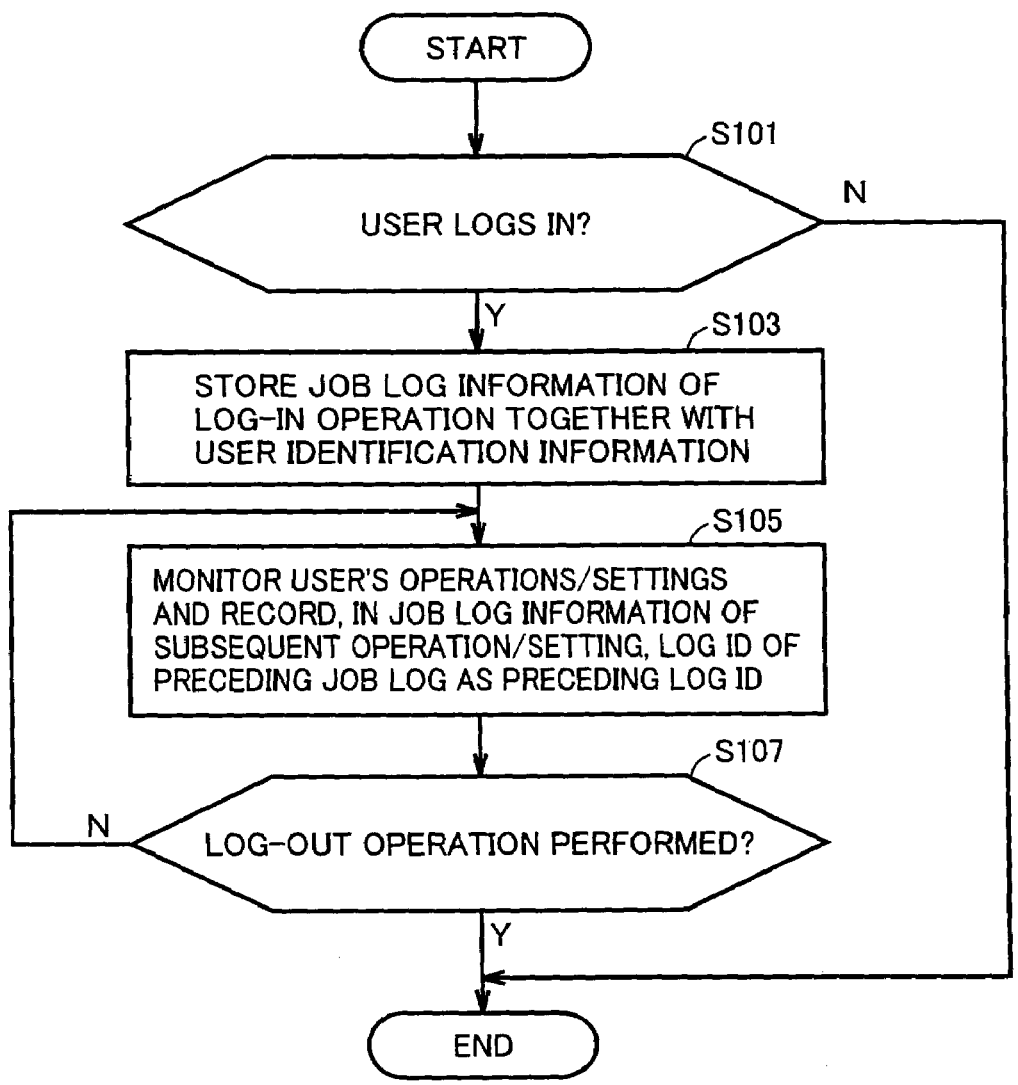
FIG. 4 is a flowchart showing a job log generation process.

The above processes (1) to (3) are now described.
(1) Job Log Generation Process FIG. 4 is a flowchart showing job logs generation process performed by MFP 10 in the present embodiment. The process shown in the flowchart of FIG. 4 is implemented by reading and execution by CPU 13 in FIG. 2 of a program stored in storage unit 23 to allow those components shown in FIG. 3 to function.

Referring to FIG. 4, job control unit 104 detects log-in of a user (Y in step S101) and then job log recording unit 105 generates and records a job log that indicates identification information specifying the user performing the log-in operation, log-in information for example, as well as the log-in operation (step S103). At this time, a specific log ID that is identification information is added to the generated job log.

Subsequently, job control unit 104 monitors operations or settings by the user based on an operation signal from operation input unit 101 or network 103 and, each time an operation or setting is detected, job log recording unit 105 generates and records a job log indicating the identification information of the user, information specifying the operation or setting and a log ID (preceding log ID) representing a job log generated according to an immediately preceding operation or setting, namely information indicating linkage (step S105). In step S105, the job log may be generated for each operation or setting or for each predetermined unit of operations or settings.

The process in step S105 is performed until a log-out operation is detected (N in step S107) and, when job control unit 104 detects the log-out operation (Y in step S107), the series of job log generation steps is ended.

Log-in of the user may be effected from panel 25 or from PC 20 through network 30. When a plurality of users simultaneously log in, the above described process may be performed in parallel for each of these users.

Specifically, when a certain user is to transmit to a receiver an image scanned by MFP 10, a series of the following operations and/or settings is carried out:

(a) input identification information of the user and perform log-in operation on panel 25;
(b) select scan operation;
(c) make mode setting concerning how image information should be processed, for example, setting of resolution, color/monochrome, file format;
(d) read an original document by image reader unit 33;
(e) combine the read image information with information about the format for example having the logotype and address of a company;
(f) search for destination;
(g) store file data of the image information in server 40;
(h) transmit to the designated destination; and
(g) perform log-out operation.

When MFP 10 of the present embodiment performs the job logs generation process as described above to perform the aforementioned series of operations and/or settings (a) to (i), nine job logs respectively indicating the operations and/or settings (a) to (i) are generated and recorded by job log recording unit 105 as job logs of each user.

FIG. 5 shows a specific example of job logs generated through the job logs generation process. Referring to FIG. 5, a job log is structured to include the identification information of the user and the log ID added in step S103 as well as the information specifying an operation or setting and information indicating linkage added in step S105.

Examples of the information specifying an operation or setting include the function of an application, for example, for which the operation or setting is made, specific details of the operation or setting and the time at which the operation or setting is made.

The information indicating the linkage is the preceding log ID in the above-described specific example of the jog log generation process. In addition to or instead of the preceding log ID, information specifying a log that is generated by an immediately succeeding operation or setting (succeeding log ID) may be included. The succeeding log ID can be included in the job log by adding the succeeding log ID to the job log that is recorded in jog log recording unit 105 and that is generated through the immediately preceding process, when the log ID is added to the job log in step S103.

As the information about linkage, at least one of the preceding log ID and the succeeding log ID is included in the job log. Accordingly, the order of a plurality of jog logs constituting a series of operations or settings can be specified.

In the specific example of job logs shown in FIG. 5, job logs are grouped for each user identification information. Alternatively, job logs may be generated for each operation and/or setting regardless of the user and each job log may include the user identification information.

(2) Sequence Extraction Process

Figure 6:
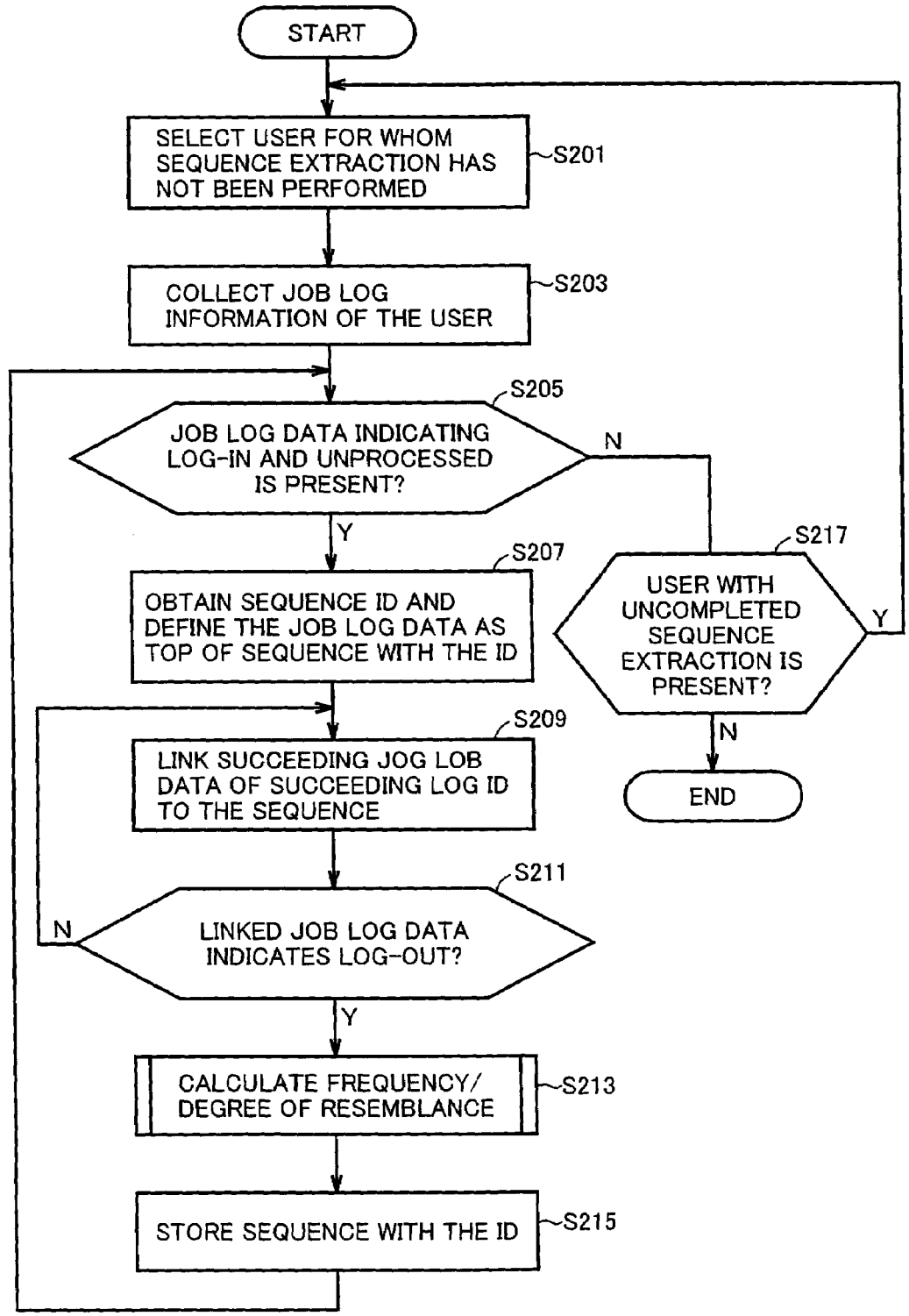
FIG. 6 is a flowchart showing a sequence extraction process.

FIG. 6 is a flowchart showing a sequence extraction process performed by MFP 10 in the present embodiment. The process shown in the flowchart of FIG. 6 is implemented by reading and execution by CPU 13 in FIG. 2 of a program stored in storage unit 23 to allow those components shown in FIG. 3 to function.

Here, as described above, the sequence refers to a series of operations and/or settings that is constituted of a plurality of job logs.

Referring to FIG. 6, it is supposed in the present embodiment that the sequence extraction process is performed on a user basis and for each user. Thus, operation/setting sequence extraction unit 106 selects from registered users a user for whom the sequence extraction process has not been performed (user with job logs) (step S201). Then, job logs including the (unprocessed) user identification information are collected from job log recording unit 105 (step S203).

When the job logs collected in step S203 include a job log that indicates the log-in operation and that has not been processed (Y in step S205), operation/setting sequence extraction unit 106 newly obtains a sequence ID and adds the sequence ID to the job log indicating the log-in operation, for representing that the log-in job log is the top of the sequence to be newly extracted (step S207). Further, the succeeding ID included in the job log is referred to, and the job log succeeding the log-in job log is extracted from job log recording unit 105 and linked to the log-in job log (step S209).

The process in step S209 is repeated until it is found that a job log that is extracted and linked is a job log indicating the log-out operation (N in step S211). When a job log extracted and linked is a job log indicating the log-out operation (Y in step S211), operation/setting sequence frequency/resemblance detection unit 107 temporarily stores the sequence comprised of the series of job logs, calculates the frequency and/or the degree of resemblance of the sequence (step S213), and information specifying this sequence is stored in operation/setting sequence presentation/registration unit 108 (step S215). The process of calculating the frequency/degree of resemblance in step S213 is hereinlater described.

When steps S205-S215 have been performed for the job logs of the user and the job logs of the user collected in step S203 no longer include a job log that is a job log indicating the log-in operation and that has not been processed (N in step S205), steps S201-S215 are carried out in a similar manner for the next user for whom the sequence extraction process has not been performed. In this way, the sequence extraction process is performed for all registered users (with job logs) (N in step S217), and the series of sequence extraction steps are completed.

In the case where MFP 10 performs the series of operations and/or settings (a) to (i) that are for transmitting a scanned image to a receiver and nine job logs respectively indicting the operations and/or settings (a) to (i) are collected in step S203, a job log indicating (a) log-in operation is defined as the top of the sequence in step S207.

Further, in step S209, the succeeding log ID included in the job log is referred to and accordingly, those job logs following (a) log-in operation that respectively indicate: (b) selection of scanning operation, (c) scan mode setting and its details, (d) execution of scanning, (e) selection of standard format file and combination with image information, (f) search for and designation of destination, (g) designation of server's folder and transfer to the designated folder, (h) transmission of image information, and (i) log-out operation, are linked successively and thus the sequence of the aforementioned series of operations and/or setting is extracted.

Figure 7:
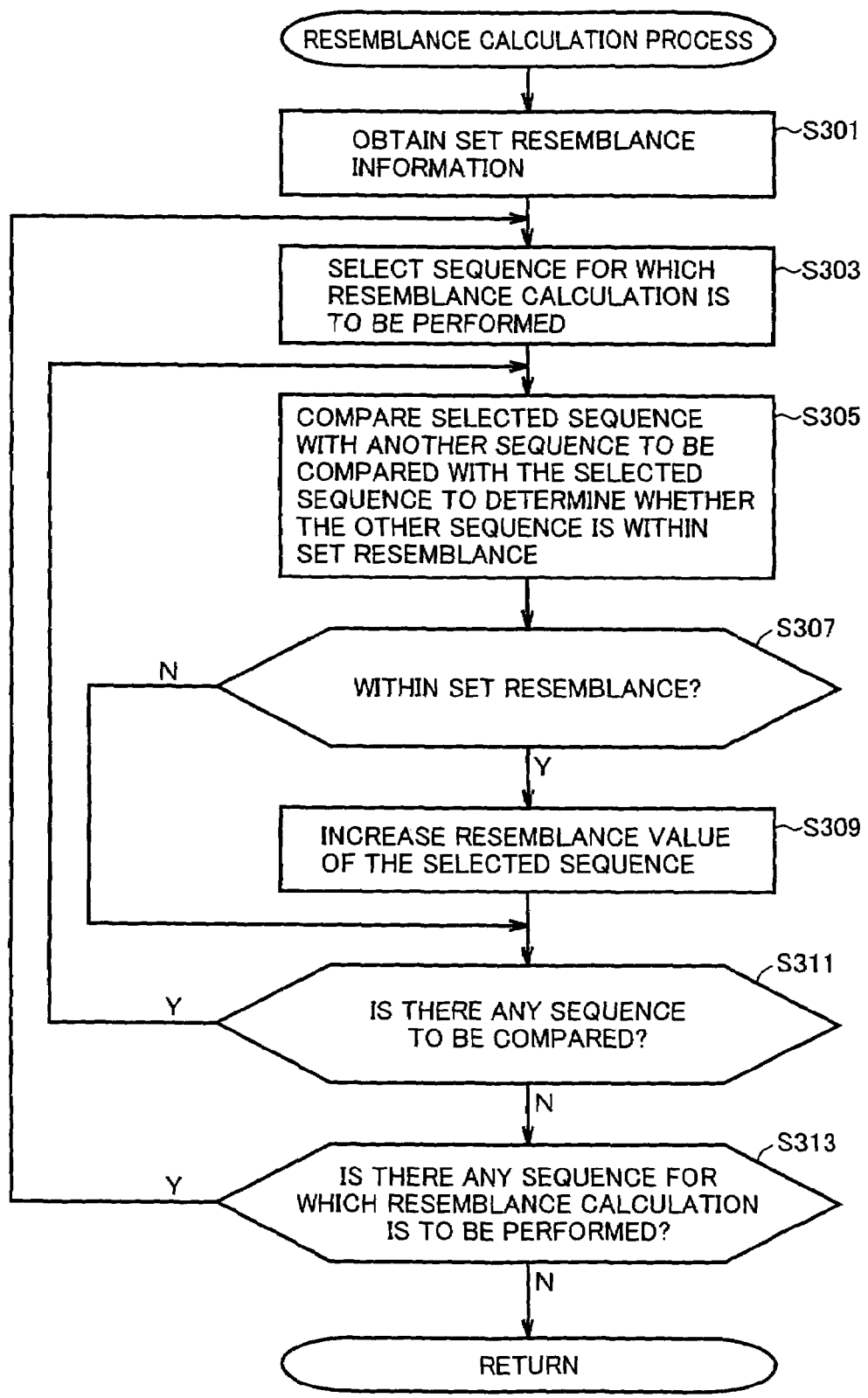
FIG. 7 is a flowchart showing a resemblance calculation process in step S213.

FIG. 7 is a flowchart showing the process of calculating the degree of resemblance included in the frequency/resemblance calculation process in step S213.

Referring to FIG. 7, operation/setting sequence frequency/resemblance detection unit 107 obtains resemblance information that is a threshold set and stored in advance (step S301).

Subsequently, from sequences temporality stored in operation/setting sequence frequency/resemblance detection unit 107, a sequence is selected as a sequence for which the degree of resemblance is to be calculated (step S303). Regarding the selected sequence, it is determined whether another sequence that is to be compared with the selected sequence is within the threshold obtained in step S301 (step S305). When the result of the determination in step S305 indicates that the other sequence to be compared with the selected sequence is within the threshold (Y in step S307), the degree of resemblance of the selected sequence is increased (step S309).

For example, if the resemblance information that is the threshold is a set value and the selected sequence and the other sequence to be compared with the selected sequence differ from each other in set value only, it is determined in step S305 that the selected sequence is a similar sequence and the degree of resemblance of the selected sequence is increased in step S309.

Alternatively, the resemblance information may be the one defining in a stepwise manner the difference between the selected sequence and the other sequence to be compared with the selected sequence to set coefficients according to the extent of the difference. In this case, in step S309, the degree of resemblance is increased by the coefficient according to the difference. More specifically, a large degree of resemblance is provided to a sequence similar to a greater extent while a small degree of resemblance is provided to a sequence similar to a smaller extent.

When steps S305-S309 have been carried out for all sequences to be compared with the selected sequence (Y in step S311), steps S303-311 are then carried out on the next sequence for which the resemblance calculation is to be performed. When steps S303-S311 have been performed on all sequences for which the resemblance calculation should be performed (N in step S313), the process returns to step S215 discussed above.

Similarly, from sequences temporarily stored in operation/setting sequence frequency/resemblance detection unit 107, a sequence is selected as a sequence to be processed. For the selected sequence, the frequency value thereof is increased when the same sequence is generated and accordingly the frequency is calculated.

Referring to FIG. 8, the sequence extracted and stored in the above-described extraction process is structured to include the sequence ID, the log ID of a log included in the sequence, the identification information of the user, and the calculated frequency (frequency of use) and/or degree of resemblance.

(3) Sequence Registration Process

Figure 9:
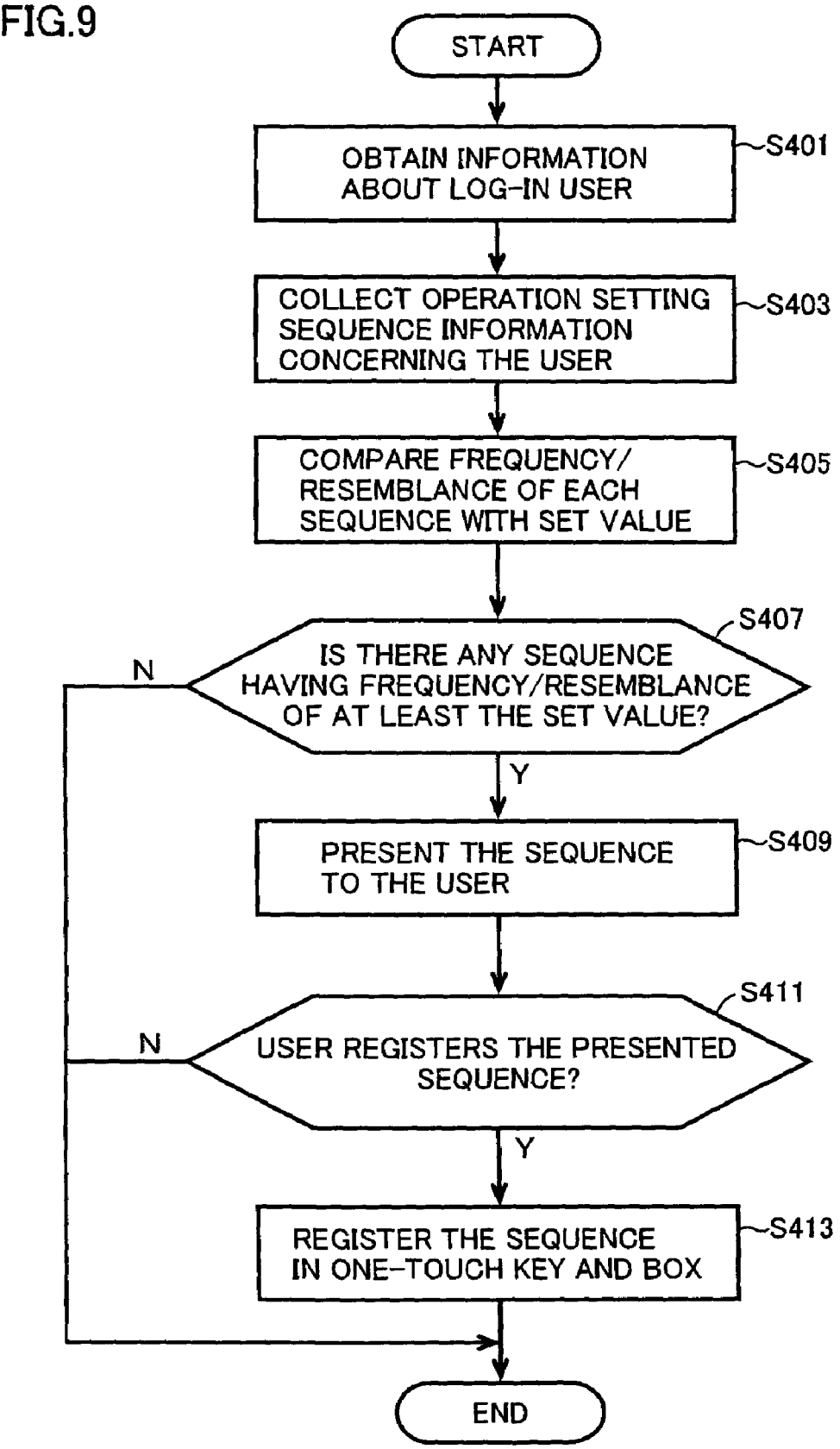
FIG. 9 is a flowchart showing a sequence registration process.

FIG. 9 is a flowchart showing a sequence registration process performed by MFP 10 in the present embodiment. The process shown in the flowchart of FIG. 9 is implemented by reading and execution by CPU 13 in FIG. 2 of a program stored in storage unit 23 to allow those components shown in FIG. 3 to function.

Referring to FIG. 9, operation/setting sequence presentation/registration unit 108 firstly obtains the identification information indicating a user performing the log-in operation, log-in information for example (step S401). From sequences stored in step S215 described above, sequences concerning the user are collected (step S403).

Subsequently, a comparison is made between a set value that is a threshold set and stored in advance and the frequency and/or the degree of resemblance provided to the sequences collected in step S403 (step S405). When a sequence with its frequency and/or degree of resemblance reaching the set value is included, namely the sequence indicates a frequently used series of operations and/or settings (Y in step S407), that sequence is displayed on panel 25 or the display device of PC 20 for presentation to the user with details of the presentation for the user to register the sequence (step S409).

When operation/setting sequence presentation/registration unit 108 detects that the user registers the presented sequence (Y in step S411), the sequence is registered in association with a one-touch key designated by the user and a BOX function, which is the function of storing settings and files for example for each user, so that the sequence is registered in the one-touch key and the BOX function (step S413), and the series of the sequence registration steps are completed.

The sequence registration process may be performed at the timing at which the user logs in to MFP 10, or another predetermined timing or regularly at appropriate intervals.

In step S409 described above, if the sequence registration process is performed at the timing at which the user logs in to MFP 10, the sequence may be presented on panel 25 or the display device of PC 20 for example in the process. If the sequence registration process is performed at another timing or regularly at appropriate intervals, the sequence may be presented on panel 25 or the display device of PC 20 for example in the process or the next time the user logs in to MFP 10. PC 20 may be informed of the sequence by an electronic mail via network 30.

Figure 10:
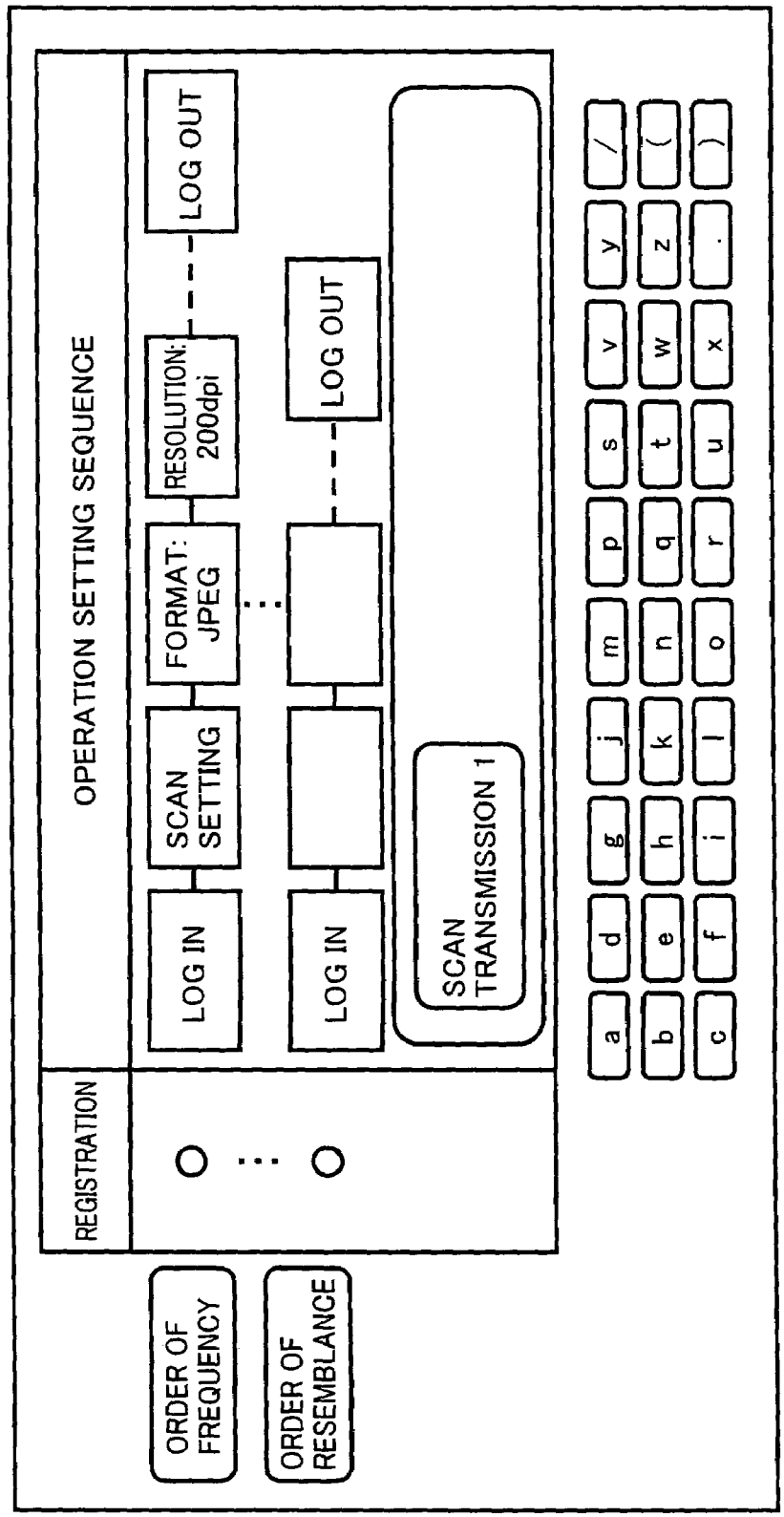
FIG. 10 shows a specific example of a screen presenting a sequence in step S409.

FIG. 10 shows a specific example of the display screen of panel 25 that is a specific example of the screen presenting the sequence in step S409.

Referring to FIG. 10, in step S409, the sequence having the frequency and/or degree of resemblance determined in step 407 as reaching the set value is presented so that the sequence can be registered. More specifically, referring to FIG. 10, in step S409, the sequence with the frequency and/or degree of resemblance determined as reaching the set value as well as keys for instructing to register the sequence (the keys are indicated by marking O under "REGISTRATION") are displayed for receiving the user's instruction to register. Further, an input of the registration name of the sequence is received from a keyboard displayed on panel 25 (or key board of MFP 10 if MFP 10 has the keyboard (not shown) as operation input unit 101). When the registration of the sequence presented in step S413 is completed, the key with the input registration name ("SCAN TRANSMISSION 1" in FIG. 10) is displayed as shown in FIG. 10.

When a plurality of sequences have the frequency and/or degree of resemblance reaching the set value as determined in step S407, the sequences are preferably displayed in the order according to the value of the frequency or degree of resemblance (in the order starting from the largest one for example). In this case, the display screen in step S409 preferably includes switches for specifying whether the sequences should be presented in the order of frequency or degree of resemblance.

Referring to FIG. 11, when the sequence is registered in step S413 in operation/setting sequence presentation/registration unit 108, to the information shown in FIG. 8 that specifies the sequence stored in operation/setting sequence presentation/registration unit 108, the information about whether the registration process is performed to register the sequence in the one-touch key and the BOX function is added ("REGISTRATION").

When the registration process is performed to register the sequence, the information indicated as item "REGISTRATION" includes the relevant information, for example, the registration name as shown in FIG. 11. If the registration process is performed while the sequence is not registered, the information indicated as item "REGISTRATION" includes the relevant information ("NONE" in FIG. 11).

MFP 10 in the present embodiment performs the processes (1) to (3) described above to present registered sequences selectively when the user logs in to MFP 10 in the network printing system in the present embodiment or when the user starts operation.

Figure 12:
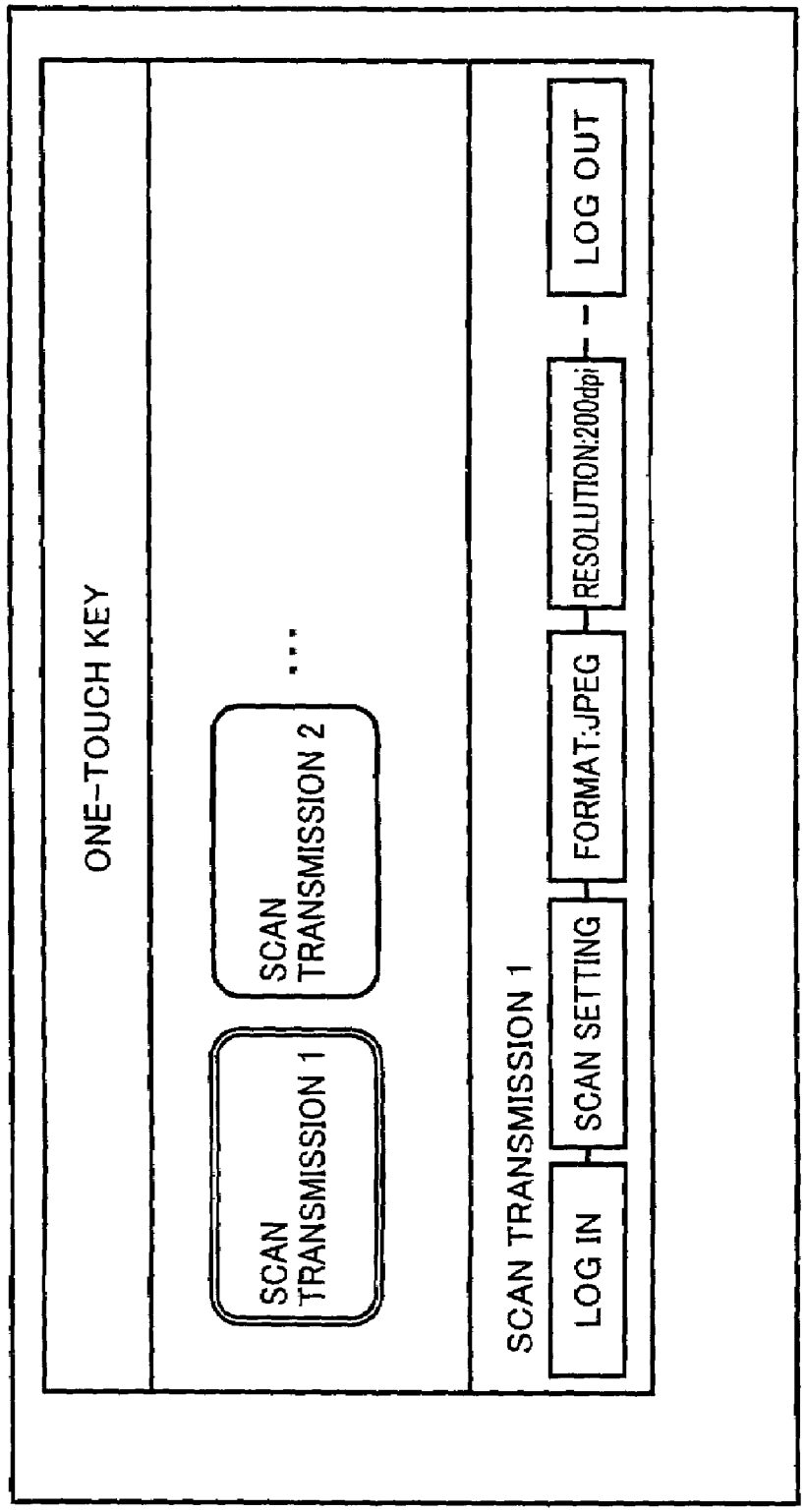
FIG. 12 shows a specific example of a screen display presenting registered sequences.

FIG. 12 shows a specific example of the screen display presenting registered sequences. The screen shown in FIG. 12 is a screen that is displayed when the sequence is registered in association with a one-touch key in step S413. Specifically, when the user logs in to MFP 10 or at a predetermined timing at which the user starts operation for example, sequences that have been registered in association with the identification information of the user are read from operation/setting sequence presentation/registration unit 108 based on the user identification information and the read sequences are displayed on panel 25 of MFP 10 or the display device of PC 10 for example.

Referring to FIG. 12, on the display screen, associated one-touch keys ("SCAN TRANSMISSION 1", "SCAN TRANSMISSION 2" . . . ) are selectively presented. In addition, operations and/or settings that are specific details of a sequence and are specified by job logs constituting the sequence are displayed.

When a one-touch key on the display screen is pressed, the associated sequence is read and MFP 10 performs operations and/or settings according to the sequence. In other words, the user may simply press the one-touch key on the display screen shown in FIG. 12 to allow the repeatedly performed sequence to be carried out automatically. Therefore, those operations and settings frequently performed can be carried out by simple operation without repeating complicated operations and settings, which improves convenience for the user.

Here, a process similar to the sequence registration process may be performed for deleting a sequence. Specifically, in step S409, a sequence that is included in those sequences registered in the above-described sequence registration process and has the frequency and/or degree of resemblance reaching a (low) set value based on which a sequence should be deleted is indicated on panel 25 or the display device of PC 20 for example and is presented so that the user deletes the sequence. In step S411, the delete operation of the user is detected and accordingly the sequence can be deleted by operation/setting sequence presentation/registration unit 108.

Such a process as described above can be performed to present, to the user, any sequence among registered sequences that has a low frequency and/or degree of resemblance, namely the sequence that will not frequently be used, for deleting the sequence. Thus, unnecessary sequences can efficiently be deleted to save the capacity of the memory.

In the sequence registration process described above, a sequence to be registered is presented to the user in step S409, the registration operation is accepted in step S411 and thereafter the sequence is registered in step S413. Alternatively, a sequence satisfying predetermined conditions may automatically be registered without the user's registration operation. In this case, a method of informing the user of the registration of a sequence and presenting the registered sequence to the user is set in advance and the presentation means setting information indicating the setting details is stored in a predetermined region of storage unit 23.

Figure 13:
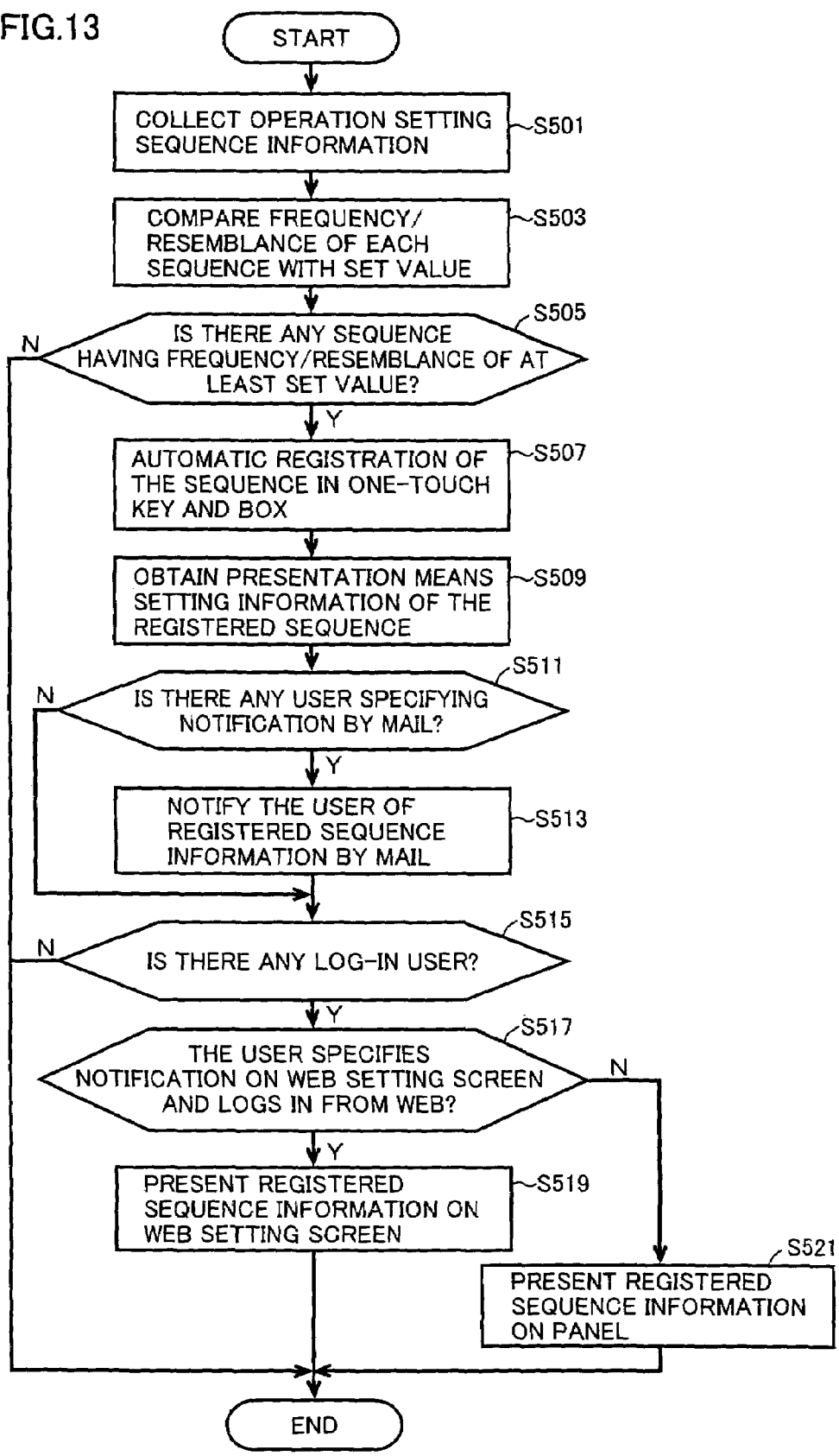
FIG. 13 is a flowchart showing an automatic sequence registration process.

FIG. 13 is a flowchart showing a modification of the sequence registration process performed by MFP 10 in the present embodiment, namely an automatic sequence registration process. The process shown in the flowchart of FIG. 13 is implemented by reading and execution by CPU 13 in FIG. 2 of a program stored in storage unit 23 to allow those components shown in FIG. 3 to function.

Referring to FIG. 13, operation/setting sequence presentation/registration unit 108 collects un-registered sequences from sequences stored in step S215 (step S501).

A set value that is a threshold set and stored in advance is compared with the frequency and/or degree of resemblance added to the sequences collected in step S501 (step S503). If a sequence having the frequency and/or degree of resemblance reaching the set value is included (Y in step S505), the sequence is registered in association with a one-touch key and a BOX function of the user indicated by the constituent job logs (step S507).

Subsequently, from a predetermined region of storage unit 23, the aforementioned presentation means setting information is obtained (step S509) and the user is notified of the sequence registration by the specified method. In other words, if registered sequences include a sequence of a user specifying notification by an electronic mail as the notification method (Y in step S511), the user is notified of the registration of the sequence stored in advance and mail data representing details is read and an electronic mail is transmitted to a destination designated by the user (step S513).

If any user logs in to MFP 10 (Y in step S515), registered sequences include a sequence of the user that specifies notification on the Web screen as a method of notifying the user and the user logs in from the Web (Y in step S517), the user is notified of the registration of the sequence stored in advance and Web screen data showing the details is read and displayed on PC 20 of the user (step S519).

If the log-in of the user in step S515 is not log-in from the Web (Y in step S515 and N in step S517), notification of the registration of the sequence is given on panel 25 and details thereof are presented (step S521).

As MFP 10 in the present embodiment performs the automatic sequence registration process, frequent operations and settings are automatically registered without user's operation, which further improves convenience for the user.

Although it is described above that the sequence extraction process is performed based on the identification information of the user and on a user basis, the extraction may be performed on a basis of what is to be processed, namely files and folders for example.

Figure 14:
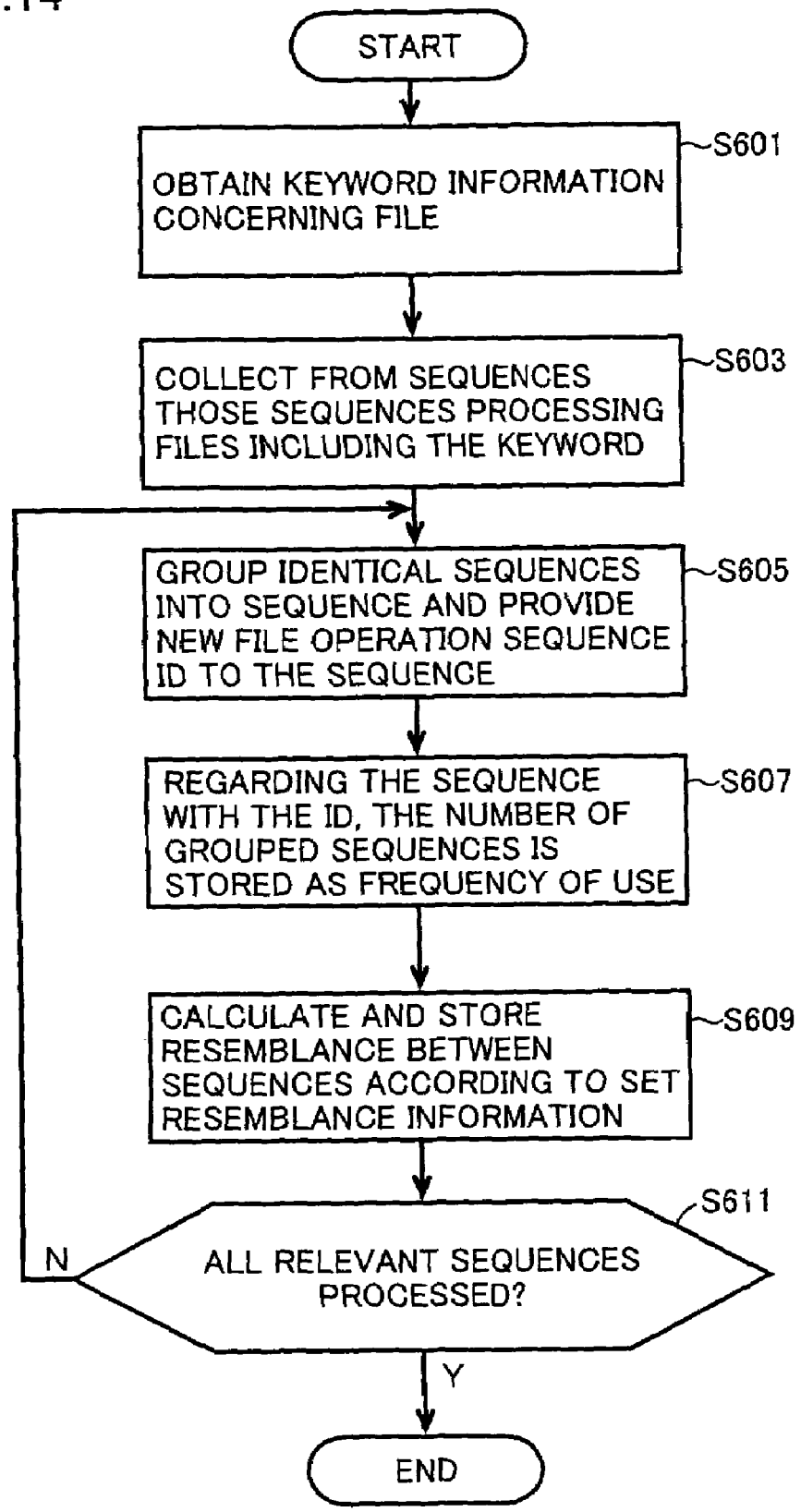
FIG. 14 is a flowchart showing a sequence extraction process on a basis of what is to be processed.

FIG. 14 is a flowchart showing a process of extracting a sequence on a basis of what is to be processed. The process shown in the flowchart of FIG. 14 is implemented by reading and execution by CPU 13 in FIG. 2 of a program stored in storage unit 23 to allow those components shown in FIG. 3 to function.

Referring to FIG. 14, after the sequence extraction process shown by steps S201-S217 (FIG. 6), operation/setting sequence extraction unit 106 obtains a file name as a keyword (step S601). In step S601, a file name designated by the user may be obtained or the file name of a file satisfying predetermined conditions (number, frequency of use for example) among files managed by file management unit 112 may be obtained.

Subsequently, operation/setting sequence extraction unit 106 uses the selected file name as a keyword to collect, from operation/setting sequence presentation/registration unit 108, sequences including job logs indicating operations and/or settings for files including the keyword (step S603), and identical sequences are grouped to which a new ID, namely a file operation sequence ID is provided (step S605).

Further, operation/setting sequence frequency/resemblance detection unit 107 sets and stores, for the new sequence generated by grouping the identical sequences in step S605, a frequency according to the number of sequences grouped in step S605 is set and stored (step S607). Furthermore, operation/setting sequence frequency/resemblance detection unit 107 performs the resemblance calculation process described above to calculate the degree of resemblance between sequences grouped in step S605 and the resemblance is stored as the resemblance of the new sequence (step S609).

Steps S605-S609 are performed on all sequences collected in step S603 (Y in step S611) and the series of steps are completed.

For example, if a plurality of users each affix a seal or signature to the front page of a file named "REPORT" to scan-transmit the file, the following steps are carried out:

(a) input user identification information and log-in on panel 25;
(b) select "REPORT" file from server 40;
(c) print the front page only;
(d) select scan operation;
(e) read by image reader unit 33 the front page with the seal or signature affixed thereto;
(f) replace the read image information with the front page of the "REPORT" file;
(g) transmit the "REPORT" file as processed to a designated destination; and
(h) log-out operation.

In this case, in step S601, the keyword "REPORT" is used to examine by MFP 10 sequences concerning those users. In step S407, when it is determined that any sequence constituted to include job logs indicating operations and/or settings for the "REPORT" file has the frequency or the degree of resemblance of at least the threshold, the sequence is registered as a sequence on the basis of what is to be processed.

At the timing at which the user logs in to MFP 10 and selects the "REPORT" file for example, the sequence is presented for example on panel 25. The user selects the sequence and gives an instruction to execute the sequence, and MFP 10 automatically and collectively performs a series of processes according to the sequence.

If the sequence is a sequence on the basis of what is to be processed, the sequence is registered in a one-touch key and the BOX function as instructed by the user in a similar manner to the process of registering a sequence discussed above. Alternatively, like the automatic sequence registration process described above, the sequence may automatically be registered in a one-touch key and the BOX function and the notification thereof may be made to the relevant user.

FIG. 15 shows a specific example of information that is registered in operation/setting sequence presentation/registration unit 108 and that specifies sequences on the basis of what is to be processed.

Referring to FIG. 15, the information that is registered in operation/setting sequence presentation/registration unit 108 and specifies sequences on the basis of what is to be processed includes: file operation sequence ID provided in step S605, sequence ID indicating the grouped sequences in step S605, user identification information included in each sequence, keyword (file name) used in step S603, frequency calculated in step S607, and degree of resemblance calculated in step S609.

More specifically, the sequence provided with the file operation sequence ID of "F18" indicates that there are 226 identical sequences that process files having any name including the keyword "REPORT". The identical sequences may be grouped for each user or regardless of users. In the above-described sequence extraction process, identical sequences are grouped regardless of users. In FIG. 15, it is seen that the sequence provided with the file operation sequence ID of "F18" refers to a group of sequences that are the sequence including the user identification information of ABC (sequence ID: 212), the sequence including DKK (sequence ID: 82, 1033), the sequence including XYZ (sequence ID: 411) and sequences including identification information of other users. These sequences represent the same series of operations and/or settings performed on files having a file name including the keyword "REPORT".

MFP 10 in the present embodiment carries out the sequence extraction process on the basis of what is to be processed and registers the extracted sequences. Accordingly, with simple operation, a sequence repeatedly performed on any object to be processed is read and MFP 10 performs operations and/or settings according to the sequence. In other words, the user can use simple operation to allow the sequence repeatedly performed on any object to be processed to be executed automatically. Thus, operations and settings frequently performed on the object to be processed (file) can be carried out with simple operation and without repeatedly performing complicated operations and settings. The convenience for the user is further improved in this way.

Modification

A description is given now of a process performed when a change is made to the functions of MFP 10 in the present embodiment by addition of a new function or update of any existing function.

Figure 16:
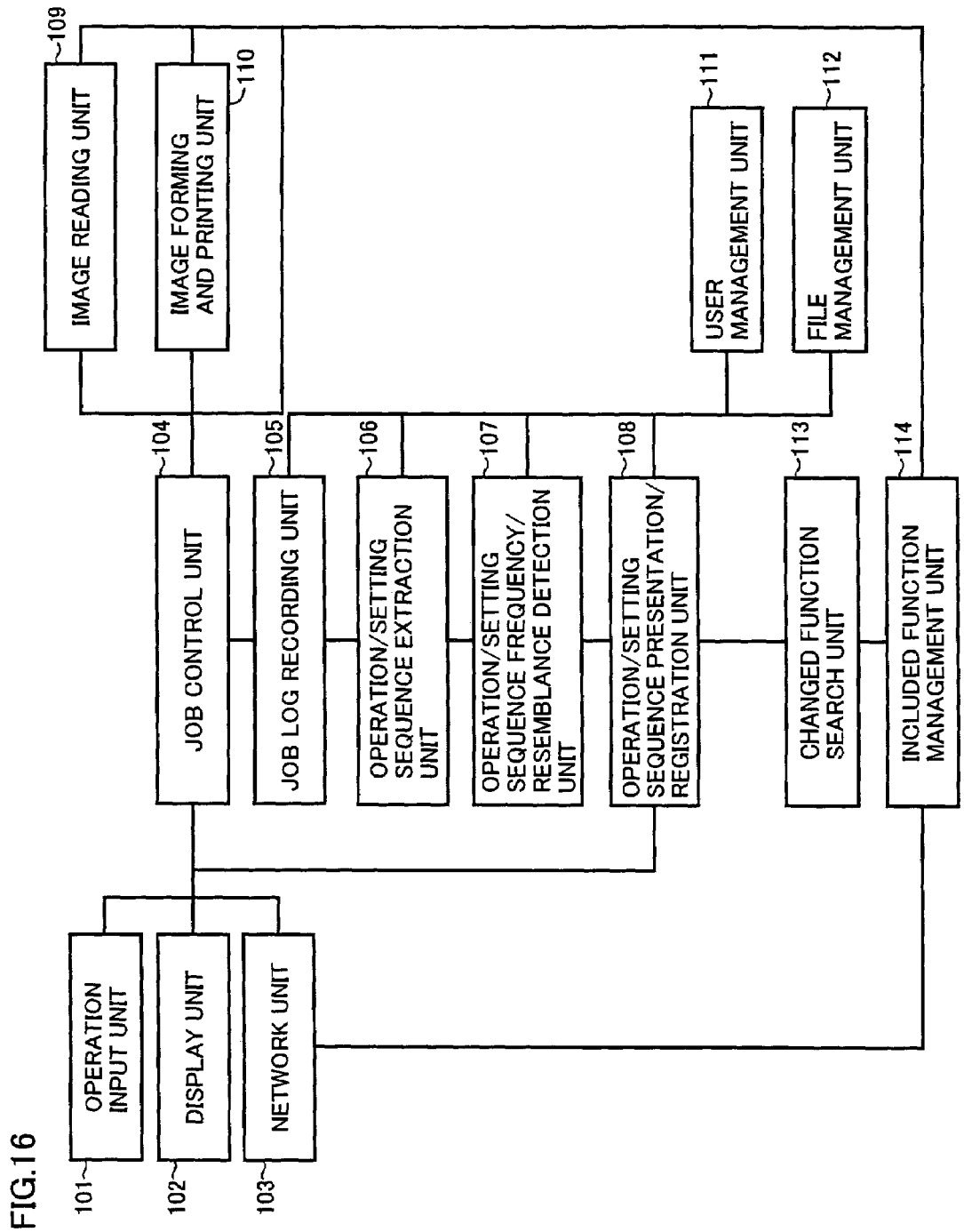
FIG. 16 is a block diagram showing the functional configuration of an MFP 10 according to a modification.

Referring to FIG. 16, MFP 10 according to the modification includes, in addition to functions 101-112 shown in FIG. 3, a changed function search unit 113 and an included function management unit 114.

Included function management unit 114 collects information concerning functions included in MFP 10 from job control unit 104, image reading unit 109, image forming and printing unit 110 and network unit 103 for example to always have information about any changed function and newly add function. Included function management unit 114 notifies changed function search unit 113 of the information concerning functions when any function of MFP 10 is changed.

Receiving the notification from included function management unit 114, changed function search unit 113 searches sequences registered in operation/setting sequence presentation/registration unit 108 to extract, from the job log information, a sequence including job logs indicating operations and/or settings using the changed function, and requests operation/setting sequence presentation/registration unit 108 to present the sequence to the user.

Operation input unit 101 enters an operation signal to job control unit 104 based on a user's operation specifying whether the changed function or the former original function should be used for executing the sequence. Network unit 103 also enters an operation signal to job control unit 104 based on user's operation on PC 20 or server 40.

Job control unit 104 outputs a control signal to job log recording unit 105 based on the entered operation signal to request a change in job logs indicating operations and/or settings constituting the sequence and using the function. According to the request from job control unit 104, job log recording unit 105 changes relevant job logs.

Figure 17:
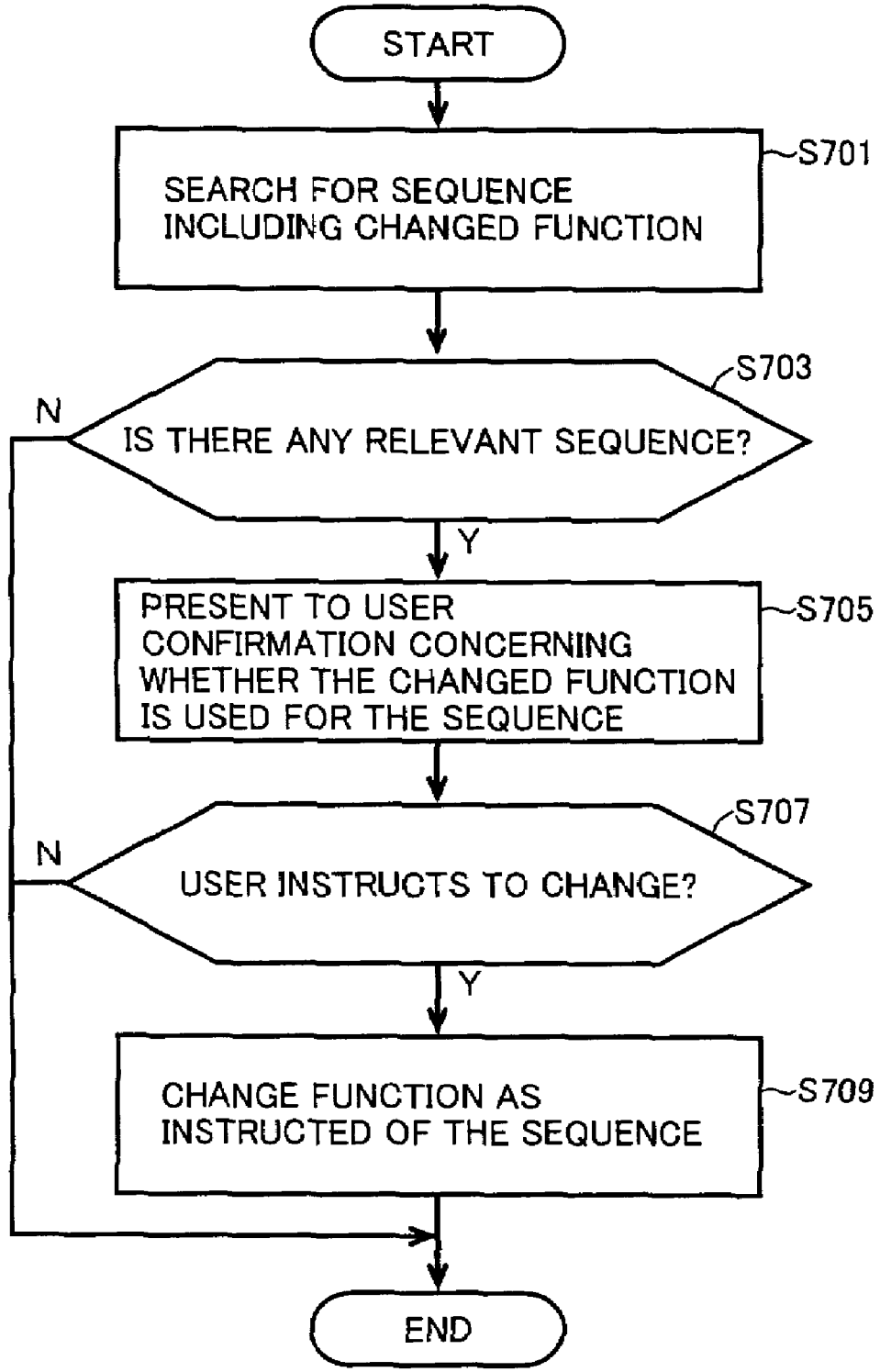
FIG. 17 is a flowchart showing a process for notification of a change in function.

FIG. 17 is a flowchart showing a process of notification of a change in function performed by MFP 10 according to the modification of the present embodiment. The process shown in the flowchart of FIG. 17 is implemented by reading and execution by CPU 13 in FIG. 2 of a program stored in storage unit 23 to allow those components shown in FIG. 16 to function.

Referring to FIG. 17, changed function search unit 113 firstly searches sequences registered in operation/setting sequence presentation/registration unit 108 based on information about a change given from included function management unit 114 to extract any sequence including job logs indicating operations and/or settings using the changed function (step S701).

After the search in step S701, when the relevant sequence is extracted (Y in step S703), operation/setting sequence presentation/registration unit 108 notifies the user of the sequence of the fact that the function is changed and confirms whether the user uses the changed function or the original function before changed (step S705).

When the user receiving the notification in step S705 gives an instruction to change the function to be used (Y in step S707), the relevant sequence registered in operation/setting sequence presentation/registration unit 108 is changed to a sequence using the changed function (step S709).

The above-described process is the one as specifically described below. It is supposed that a sequence of reading an original document, converting the document into an image file and transmitting the image file is registered for a user. If an image-file conversion function with a password protection function is introduced, the user is notified of the fact that the image file conversion function is changed and, according to an instruction from the user, an operation of converting into an image file in the sequence is changed to the operation of converting into an image file using the new image file conversion function with the password protection function.

MFP 10 according to the modification of the present embodiment performs the process of giving the notification of the change in function. Thus, when any change is made in function, the user who may use the function is notified of the change and, according to an instruction from the user, the changed function may be introduced into the sequence relevant to the user. Therefore, without the complicated user's operation for change, optimum functions can be provided to the user, which further improves convenience.

The embodiment heretofore discussed is applied to the information processing apparatus of the present invention that is the MFP serving as an image processing apparatus. However, the information processing apparatus is not limited to the MFP and may be one of other information processing apparatus. As a specific example of implementing the information processing apparatus as a digital household electrical appliance, implementation with a DVD (Digital Video Disc) recorder having a hard disc drive (HDD) is described.

Figure 18:
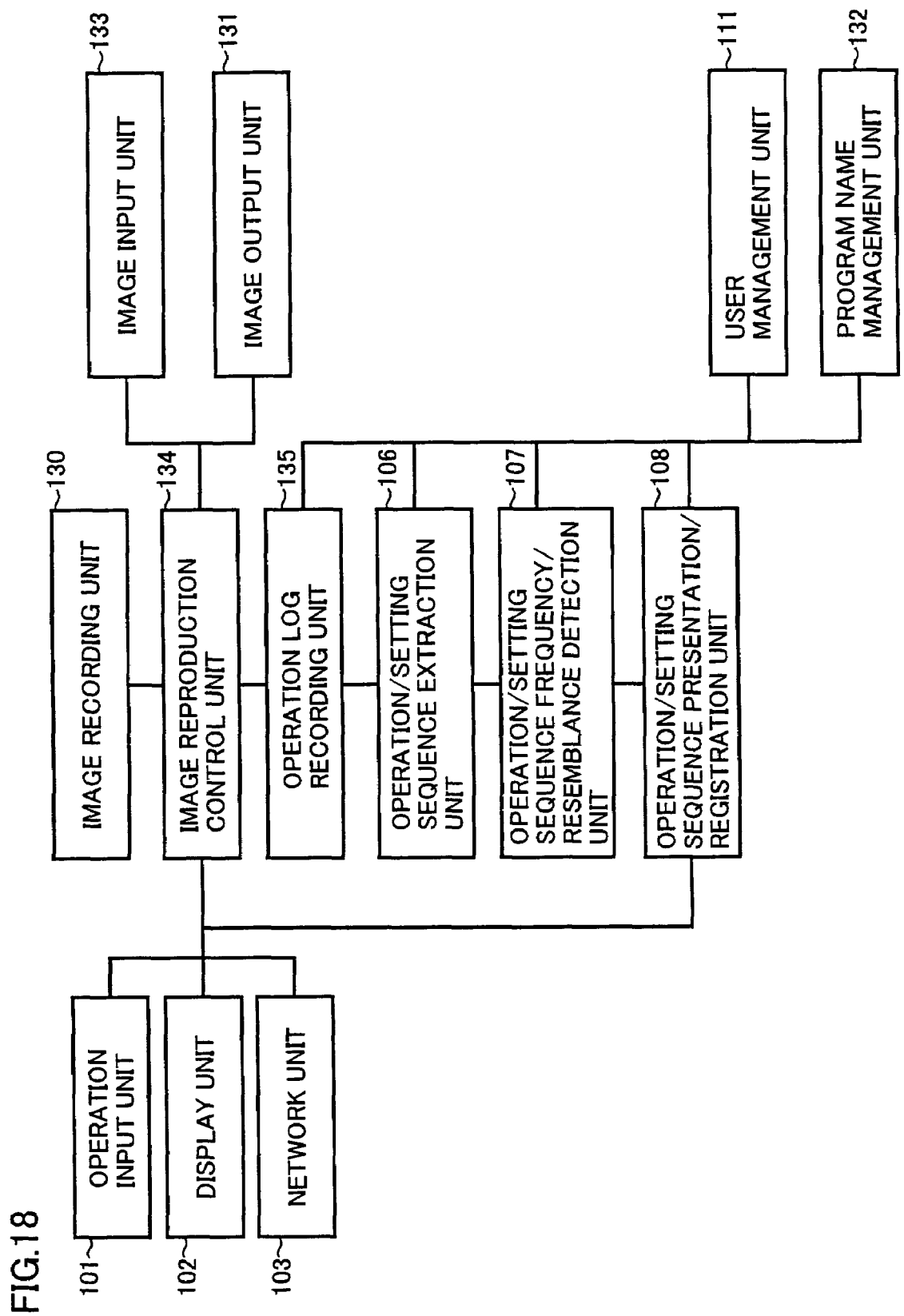
FIG. 18 is a block diagram showing the functional configuration of a DVD (Digital Video Disc) recorder.

The functions shown in FIG. 18 are each implemented by reading and execution of a program stored in a storage unit or the like by a CPU (not shown) of the DVD recorder.

Referring to FIG. 18, the DVD recorder in the present embodiment includes an image reproduction control unit 134 instead of job control unit 104 of MFP 10 shown in FIG. 3, an operation log recording unit 135 instead of job log recording unit 105, an image input unit 133 instead of image reading unit 109, an image output unit 131 instead of image forming and printing unit 110, a program name management unit 132 managing reproduced program names instead of file management unit 112, and an image recording unit 130.

Image reproduction control unit 134 outputs a control signal to operation log recording unit 135 based on an operation signal that is entered from operation input unit 101 or network unit 103 to request generation and recording of an operation log representing a history of operations and settings.

Operation log recording unit 135 generates and records an operation log based on the operation signal according to the control signal from image reproduction control unit 134.

Operation/setting sequence extraction unit 106 accesses operation log recording unit 135 to extract a sequence that is a series of operations and/or settings.

It is supposed here that the DVD recorder in the present embodiment frequently performs the sequence that is a series of operations and/or settings including:
  (a) reservation for recording on the HDD;
  (b) play;
  (c) commercial cutting;
  (d) reduction in transfer rate from 8 Mbps to 2 Mbps (for size reduction); and
  (e) recording on DVD.

In this case, the DVD recorder in the present embodiment performs the above-described operation (job) log generation process, sequence extraction process and sequence registration process to extract the sequence as indicated above from the history information in the user operation settings. According to a user's instruction, the sequence is registered in a one-touch key for example.

After the sequence is thus registered, the user may operate the one-touch key associated with the sequence to designate a program to be recorded, and accordingly the sequence of the series of operations and settings can be executed.

Here, the sequence extraction process on the basis of what is to be processed may be performed to use, as a keyword, a specific character string representing a program name for extracting an operation setting sequence relevant to the program name and providing similar functions.

Figure 19:
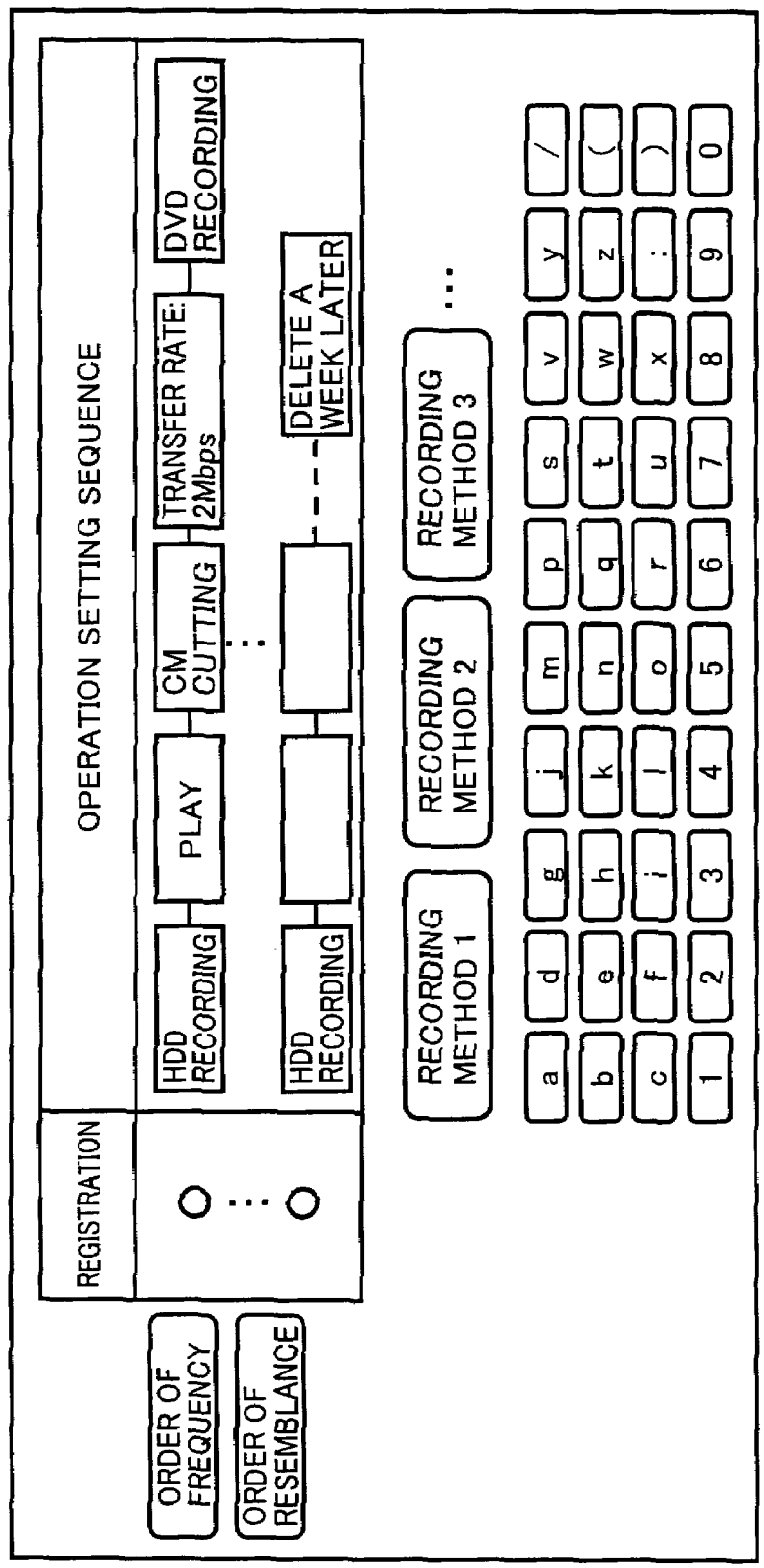
FIG. 19 shows a specific example of a screen display for presentation and registration of a sequence on the DVD recorder.

The screen display shown in FIG. 19 is indicated for example when the power is turned on or when the user performs the first operation (HDD recording operation in this specific example) of the sequence for allowing the user to register the sequence in a one-touch key (RECORDING METHOD 1 for example). The one-touch key may be named for the user to identify easily. At any later time, this one-touch key may be displayed on a recording setting screen for the user to immediately start the operation. Further, supposing that the automatic sequence registration process described above is executed to automatically register a sequence and the DVD recorder is connected to a home LAN that is network 30, notification of the registration may be transmitted to PC 20 of the relevant user.

Furthermore, the processing method performed by such an information processing apparatus as MFP 10 or DVD recorder as discussed above may be provided in the form of an information processing program.

The information processing program may be provided as a program product by being recorded on such a computer-readable recording medium as flexible disc, CD-ROM (Compact Disc Read-Only Memory), ROM (Read-Only Memory), RAM (Random Access Memory) and memory card attached to a computer. Alternatively, the information processing program may be provided by being recorded on such a recording medium as hard disc included in a computer. The information processing program may alternatively be provided by being downloaded via a network.

The program product to be provided is executed by being installed in such a program storage unit as hard disc. The program product includes a program itself and a recording medium with the program recorded thereon.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus comprising:
   a job log recording unit for generating and recording a job log including identification information of a user, information specifying an operation of said user on said information processing apparatus and information indicating linkage with an adjacent job log;
   a sequence extraction unit for extracting, from said job log recording unit, a job log constituting a sequence that is an operation of said user;
   a sequence presentation unit for presenting said sequence to said user;
   a sequence registration unit for registering, in association with a predetermined function, said sequence presented by said sequence presentation unit; and
   a notification unit for notifying said user of the registration, wherein said notification unit includes at least one of a transmission unit for transmitting an electronic mail providing notification of said registration, a web display unit for displaying said registration on a web screen and a display unit for displaying said registration.

2. The information processing apparatus according to claim 1, further comprising:
   a frequency calculation unit for calculating a frequency of occurrences of said operation of said sequence; and
   a resemblance calculation unit for calculating degree of resemblance of said sequence according to the number of other sequences recorded in said job log recording unit and similar to said sequence, wherein
   said sequence presentation unit presents said sequence having said frequency of occurrences and/or said degree of resemblance that reaches a predetermined value.

3. The information processing apparatus according to claim 1, wherein
   said job log further includes information specifying what is to be processed by said operation,
   said sequence extraction unit further extracts a sequence of an operation on said what is to be processed, from sequences extracted by said sequence extraction unit, and
   said sequence presentation unit presents said sequence that is extracted by said sequence extraction unit and that is an operation on said what is to be processed.

4. The information processing apparatus according to claim 3, further comprising:
   a frequency calculation unit for calculating a frequency according to the number of sequences that are each extracted by said sequence extraction unit and that are each an of operation on said what is to be processed; and
   a resemblance calculation unit for calculating a degree of resemblance between sequences that are extracted by said sequence extraction unit and that are each an operation on said what is to be processed, wherein
   said sequence presentation unit presents said sequence having said frequency and/or said degree of resemblance that reaches a predetermined value.

5. The information processing apparatus according to claim 3, wherein
   said sequence presentation unit presents said sequence when said what is to be processed is selected as an object on which operation is to be performed.

6. The information processing apparatus according to claim 1, further comprising a sequence deletion unit for deleting a sequence presented by said sequence presentation unit.

7. An information processing apparatus comprising:
   a job log recording unit for generating and recording a job log including identification information of a user, information specifying an operation of said user on said information processing apparatus and information indicating linkage with an adjacent job log;
   a sequence extraction unit for extracting, from said job log recording unit, a job log constituting a sequence that is an operation of said user;
   a sequence presentation unit for presenting said sequence to said user;
   a function change detection unit for detecting a change of a function of said information processing apparatus;
   a changed function sequence extraction unit for extracting, from sequences extracted by said sequence extraction unit, a sequence constituted to include a job log including information specifying an operation using a function relevant to said function;
   a changed function sequence presentation unit for presenting said sequence extracted by said changed function sequence extraction unit; and
   a sequence change unit for changing said sequence according to said change of said function.

8. A computer-readable recording medium having a computer program recorded thereon that causes a computer to execute information processing by an information processing apparatus, said information processing comprising:
   generating a job log including identification information of a user, information specifying an operation of said user on said information processing apparatus and information indicating linkage with an adjacent job log and recording the job log in a job log recorder;
   extracting, from said job log recorder, a job log constituting a sequence that is an operation of said user;
   presenting said sequence to said user;
   registering, in association with a predetermined function, said sequence presented to said user; and
   notifying said user of the registration,
   wherein said notifying includes at least one of transmitting an electronic mail providing notification of said registration, displaying said registration on a web screen and displaying said registration on a display device.

9. The computer-readable recording medium according to claim 8, said information processing further comprising:
   calculating a frequency of occurrences of said operation of said sequence; and
   calculating a degree of resemblance of said sequence according to the number of other sequences recorded in said job log recorder and similar to said sequence,
   wherein said presenting further comprises presenting said sequence having said frequency of occurrences and/or said degree of resemblance that reaches a predetermined value.

10. The computer-readable recording medium according to claim 8, wherein
    said job log further includes information specifying what is to be processed by said operation, said extracting further comprises extracting a sequence of an operation on said what is to be processed, from sequences extracted from said job log recorder, and said presenting further comprises presenting said sequence that is extracted by said extracting and that is an operation on said what is to be processed.

11. The computer-readable recording medium according to claim 10, said information processing further comprising:

calculating a frequency according to the number of sequences that are each extracted in said extracting and that are each an operation on said what is to be processed; and calculating a degree of resemblance between sequences that are extracted by said extracting and that are each an operation on said what is to be processed, wherein said presenting further comprises presenting said sequence having said frequency and/or said degree of resemblance that reaches a predetermined value.

12. The computer-readable recording medium according to claim 10, wherein said presenting further comprises presenting said sequence when said what is to be processed is selected as an object on which operation is to be performed.

13. The computer-readable recording medium according to claim 8, said information processing further comprising deleting a sequence presented in said presenting to said user.

14. A computer-readable recording medium having a computer program recorded thereon that causes an information processing apparatus to execute information processing, said information processing comprising:

generating a job log including identification information of a user, information specifying an operation of said user on said information processing apparatus and information indicating linkage with an adjacent job log and recording the job log in a job log recorder;

extracting, from said job log recorder, a job log constituting a sequence that is an operation of said user;

presenting said sequence to said user;

detecting a change of a function of said information processing apparatus;

extracting, from sequences extracted from said job log recorder, a sequence constituted to include a job log including information specifying an operation using a function relevant to said function;

presenting said sequence extracted from sequences extracted from said job log recorder; and changing said sequence according to said change of said function.

* * * * *